US012174558B2

(12) United States Patent
Ogino et al.

(10) Patent No.: US 12,174,558 B2
(45) Date of Patent: Dec. 24, 2024

(54) DEVELOPER REPLENISHMENT DEVICE AND IMAGE FORMING APPARATUS

(71) Applicant: CANON KABUSHIKI KAISHA, Tokyo (JP)

(72) Inventors: Hiroki Ogino, Shizuoka (JP); Hiroomi Matsuzaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/206,144

(22) Filed: Jun. 6, 2023

(65) Prior Publication Data

US 2023/0324831 A1 Oct. 12, 2023

Related U.S. Application Data

(63) Continuation of application No. PCT/JP2021/046398, filed on Dec. 9, 2021.

(30) Foreign Application Priority Data

Dec. 17, 2020 (JP) ................................ 2020-209007

(51) Int. Cl.
*G03G 15/08* (2006.01)

(52) U.S. Cl.
CPC ..... *G03G 15/0879* (2013.01); *G03G 15/0865* (2013.01); *G03G 15/0894* (2013.01);
(Continued)

(58) Field of Classification Search
CPC ........... G03G 15/0865; G03G 15/0874; G03G 15/0875; G03G 15/0879; G03G 2215/066;
(Continued)

(56) References Cited

U.S. PATENT DOCUMENTS 8,565,649 B2 * 10/2013 Murakami ......... G03G 15/0872
399/258
9,529,299 B2 * 12/2016 Okino ................ G03G 15/0872
(Continued)

FOREIGN PATENT DOCUMENTS

JP 2003-098813 A 4/2003
JP 2005-195659 A 7/2005
(Continued)

OTHER PUBLICATIONS

International Search Report and Written Opinion for International Patent Application No. PCT/JP2021/046398.
(Continued)

*Primary Examiner* — Robert B Beatty
(74) *Attorney, Agent, or Firm* — Venable LLP

(57) ABSTRACT

A developer cartridge includes accommodating container, a pump that is variable in volume, a feeding path member of which one end is connected to the pump and the other end is provided with a discharge outlet, the feeding path member being configured to form a path for feeding developer between the pump and the discharge outlet, and a transporting member configured to communicate the developer and the accommodating container and to transport the developer from the accommodating container to the feeding path member. The transporting member includes a moving mechanism configured to move a holding member between a first position where the holding member is capable of being filled with the developer from the accommodating container by accommodating the container and the holding member and a second position where the holding member and the feeding path member communicate with each other.

10 Claims, 13 Drawing Sheets

(52) U.S. Cl.
CPC ................. *G03G 2215/066* (2013.01); *G03G 2215/0685* (2013.01)

(58) Field of Classification Search
CPC ..... G03G 2215/068; G03G 2215/0682; G03G 2215/0685; B65B 1/16; B65B 1/30; B65B 37/06; B65B 37/14; G01F 11/24
USPC ..... 399/258, 260, 262; 222/325, 339, 383.1, 222/385, DIG. 1
See application file for complete search history.

(56) References Cited

U.S. PATENT DOCUMENTS

| | | | | |
|---|---|---|---|---|
| 2004/0117970 | A1 | 6/2004 | Ogino et al. | |
| 2005/0078977 | A1 | 4/2005 | Batori et al. | |
| 2005/0105936 | A1 | 5/2005 | Morioka et al. | |
| 2005/0163537 | A1 | 7/2005 | Muramatsu et al. | |
| 2006/0051135 | A1 | 3/2006 | Sato et al. | |
| 2007/0053721 | A1* | 3/2007 | Matsumoto | G03G 15/0879 399/258 |
| 2007/0053722 | A1 | 3/2007 | Sato et al. | |
| 2008/0025757 | A1 | 1/2008 | Sato et al. | |
| 2009/0010685 | A1* | 1/2009 | Makino | G03G 15/0855 399/292 |
| 2009/0028611 | A1* | 1/2009 | Matsumoto | G03G 15/0879 399/258 |
| 2009/0123174 | A1 | 5/2009 | Wata et al. | |
| 2012/0014722 | A1 | 1/2012 | Okino et al. | |
| 2013/0016999 | A1* | 1/2013 | Tohmatsu | G03G 15/087 399/258 |
| 2013/0136489 | A1 | 5/2013 | Yamaguchi et al. | |
| 2013/0343785 | A1 | 12/2013 | Matsuzaki et al. | |
| 2014/0016961 | A1 | 1/2014 | Yasui et al. | |
| 2014/0029974 | A1 | 1/2014 | Uesugi et al. | |
| 2014/0064793 | A1 | 3/2014 | Matsuzaki et al. | |
| 2014/0072329 | A1 | 3/2014 | Uesugi et al. | |
| 2014/0072346 | A1 | 3/2014 | Furutani et al. | |
| 2014/0079432 | A1 | 3/2014 | Matsuzaki et al. | |
| 2014/0126928 | A1 | 5/2014 | Batori et al. | |
| 2014/0199094 | A1 | 7/2014 | Matsuzaki et al. | |
| 2014/0363196 | A1 | 12/2014 | Wada et al. | |
| 2015/0093153 | A1 | 4/2015 | Ogino et al. | |
| 2015/0205226 | A1 | 7/2015 | Komatsu et al. | |
| 2016/0170330 | A1 | 6/2016 | Matsuzaki et al. | |
| 2017/0003622 | A1 | 1/2017 | Matsuzaki | |
| 2017/0115599 | A1* | 4/2017 | Kosone | G03G 21/18 |
| 2017/0212452 | A1 | 7/2017 | Matsuzaki et al. | |
| 2017/0235251 | A1 | 8/2017 | Matsuzaki et al. | |
| 2017/0242367 | A1* | 8/2017 | Jimba | G03G 15/0875 |
| 2017/0322512 | A1 | 11/2017 | Kamoshida et al. | |
| 2018/0004125 | A1 | 1/2018 | Nonaka et al. | |
| 2018/0113399 | A1 | 4/2018 | Matsuzaki et al. | |
| 2018/0136588 | A1 | 5/2018 | Matsuzaki et al. | |
| 2019/0018363 | A1 | 1/2019 | Yamaguchi et al. | |
| 2019/0094759 | A1 | 3/2019 | Matsuzaki et al. | |
| 2020/0012213 | A1 | 1/2020 | Ogino et al. | |
| 2020/0310298 | A1 | 10/2020 | Kawata et al. | |
| 2020/0401079 | A1 | 12/2020 | Kamoshida et al. | |
| 2021/0373460 | A1* | 12/2021 | Kawamura | G03G 15/0822 |
| 2022/0206411 | A1 | 6/2022 | Matsuzaki et al. | |

FOREIGN PATENT DOCUMENTS

| | | | |
|---|---|---|---|
| JP | 2009-116198 | A | 5/2009 |
| JP | 5623109 | B2 | 11/2014 |
| JP | 2017-102344 | A | 6/2017 |
| JP | 2020-166182 | A | 10/2020 |

OTHER PUBLICATIONS

Extended European Search Report dated Oct. 23, 2024 in corresponding European Patent Appln. No. 21906675.0.

* cited by examiner

DEVELOPER REPLENISHMENT DEVICE AND IMAGE FORMING APPARATUS

FIELD OF THE INVENTION

The present invention relates to an image forming apparatus using an electrophotographic forming process and a developer replenishment device used in the image forming apparatus.

BACKGROUND ART

Conventional electrophotographic image forming apparatuses employ a "toner cartridge" that integrally consists of an accommodating container accommodating toner and a discharge means for discharging the accommodated toner from the accommodating container.

For example, the toner cartridge B100 shown in FIG. 13 of Japanese Patent No. 5623109 shows a configuration with a developer compartment 117 for storing toner and a discharge means for discharging toner. As the discharge means, a configuration was proposed in which a bellows pump 121 is used to discharge the toner downward from the discharge portion 123.

SUMMARY OF THE INVENTION

Problem to be Solved by the Invention

The present invention is an advancement of the conventional technology described above and provides a configuration that can convey a predetermined amount of toner more consistently.

Means for Solving the Problem

The developer replenishment device of the present invention is a developer replenishment device for use with an image forming apparatus comprising: an accommodating container configured to accommodate developer; a pump that is variable in volume; a feeding path member of which one end communicates with the pump and the other end is provided with an opening portion and configured to form a path for feeding the developer between the pump and the opening portion; and a transporting member configured to communicate the developer and the accommodating container and to transport the developer from the accommodating container to the feeding path member, wherein the transporting member includes a retention member provided with a retention portion for retaining a predetermined volume of the developer; and a moving mechanism configured to move the retention member between a first position where the retention portion is capable of being filled with the developer from the accommodating container by accommodating the container and the retention portion and a second position where the retention portion and the feeding path member are communicated communicate with each other.

Effect of the Invention

According to the present invention, a predetermined amount of toner can be transported more stably.

Figure 7:
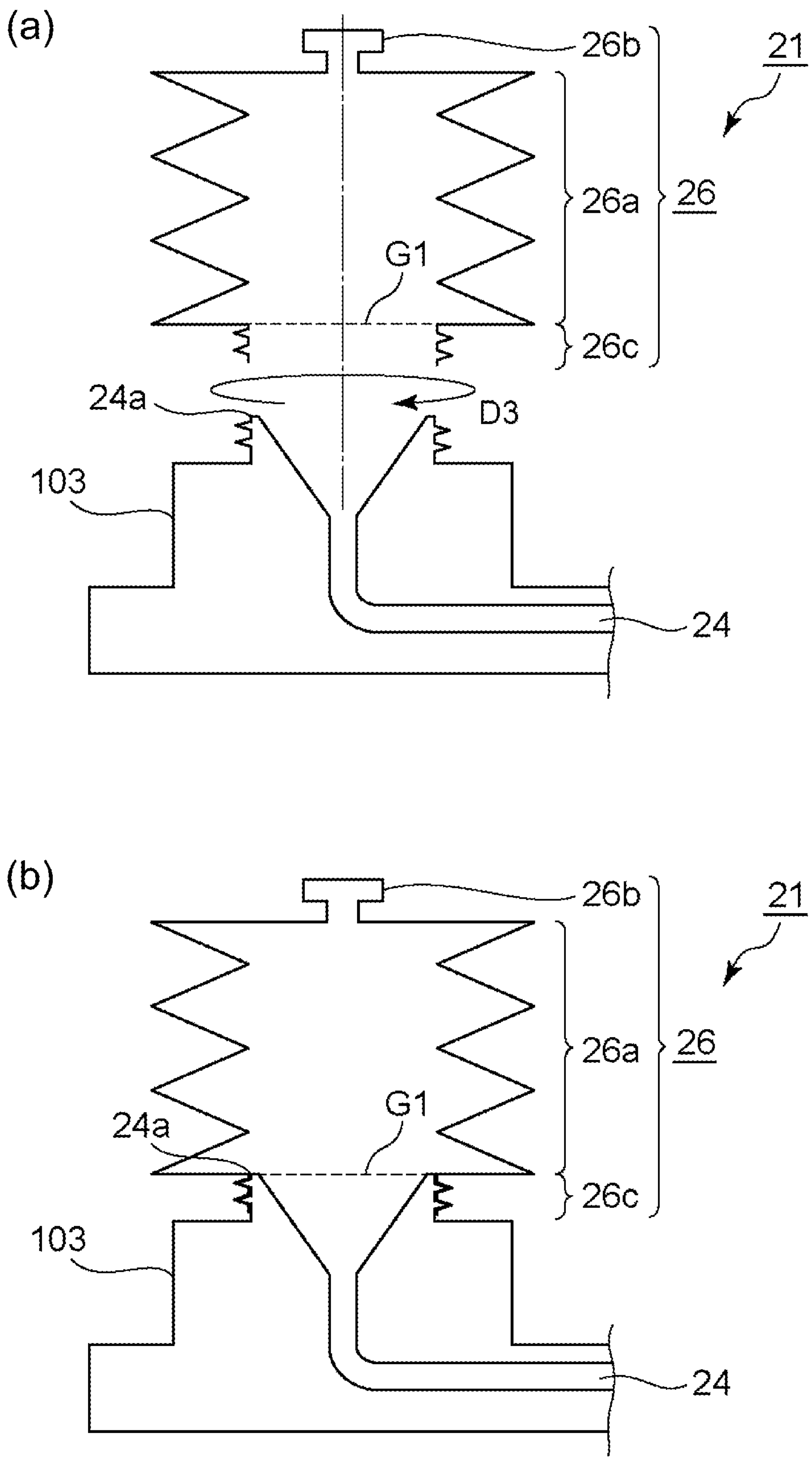

Parts (a) and (b) of FIG. 7 are cross-sectional views of the pump portion during assembly according to embodiment 1 of the present invention.

Figure 8:
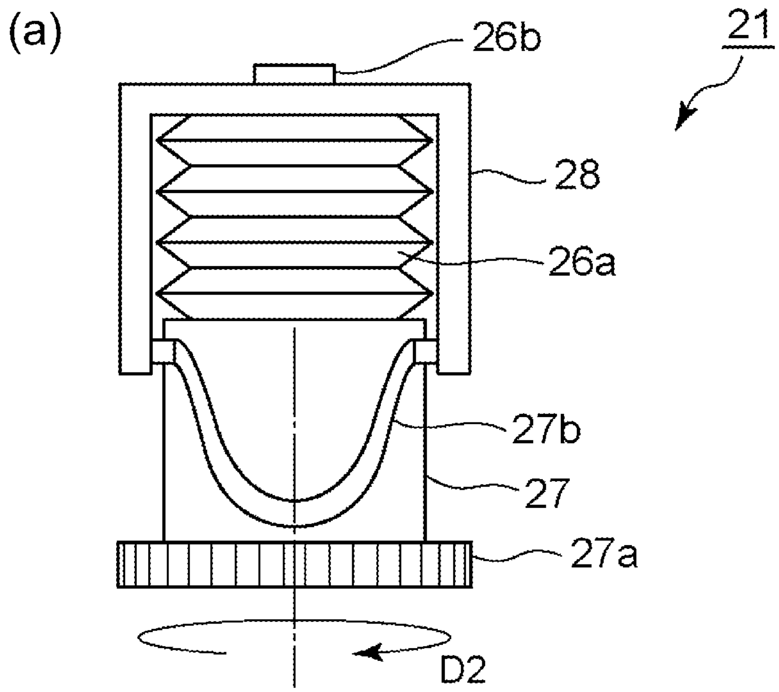
Figure 8:
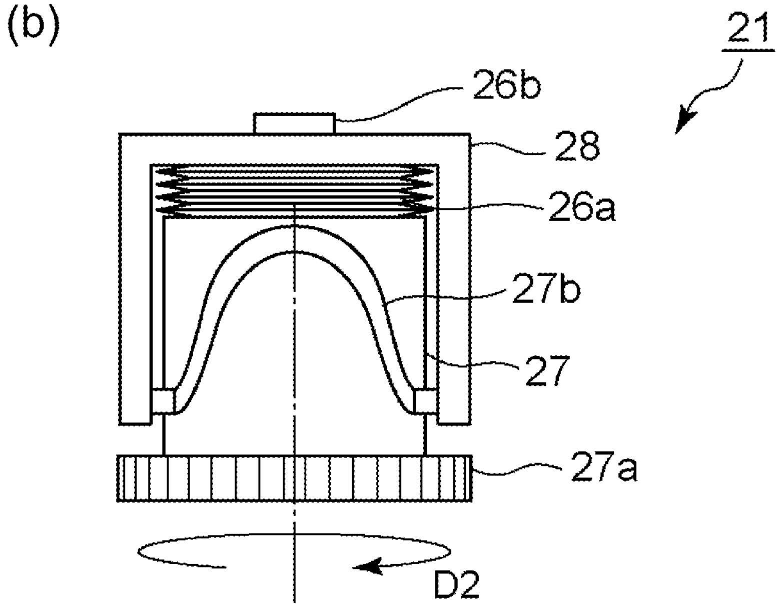

Parts (a) and (b) of FIG. 8 are conceptual views showing the various states of the pump portion during its operation according to embodiment 1 of the present invention.

Figure 9:
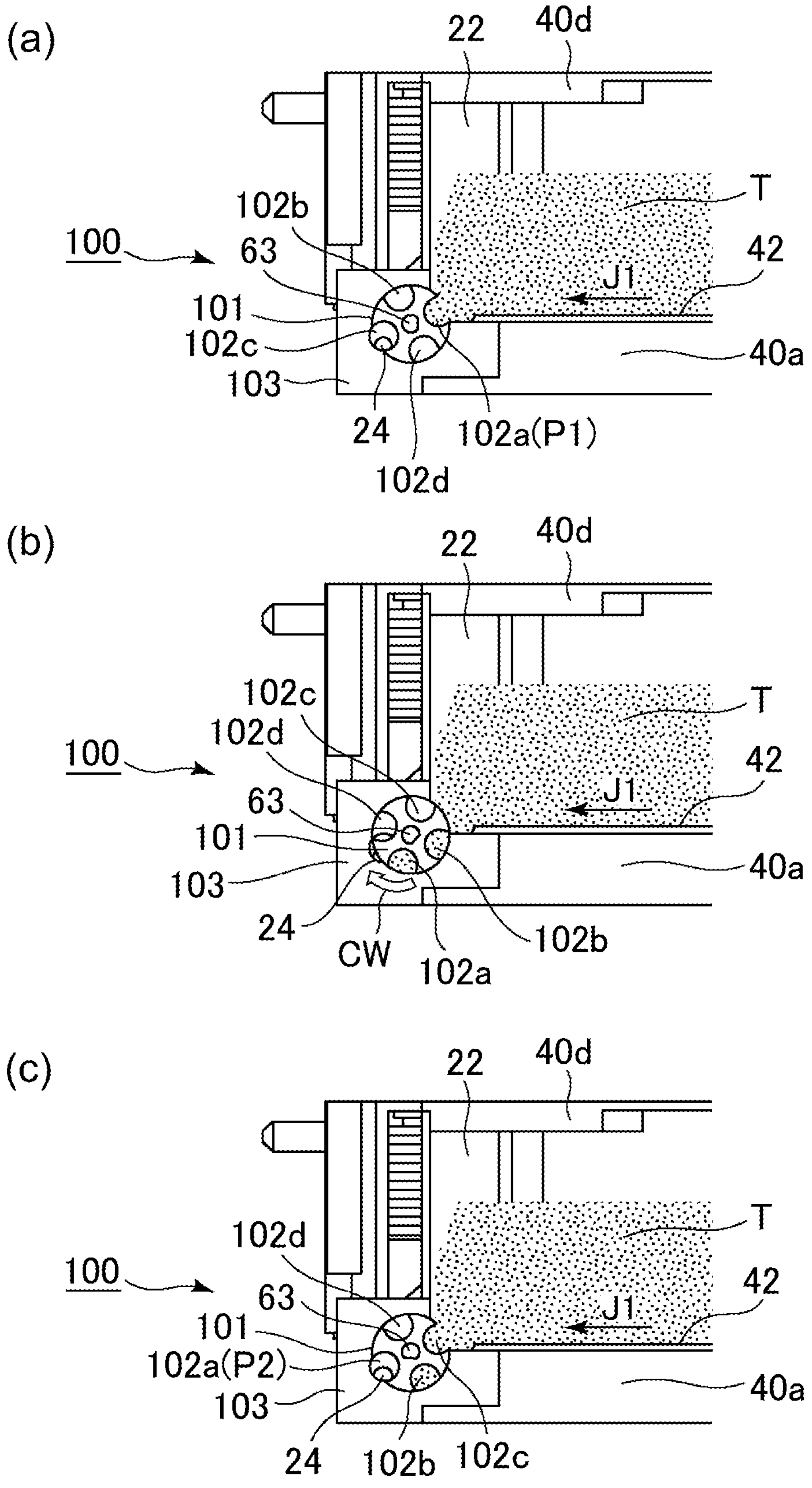

Parts (a) through (c) of FIG. 9 are cross-sectional views of the various states of the toner transport member in operation according to embodiment 1 of the present invention.

Figure 10:
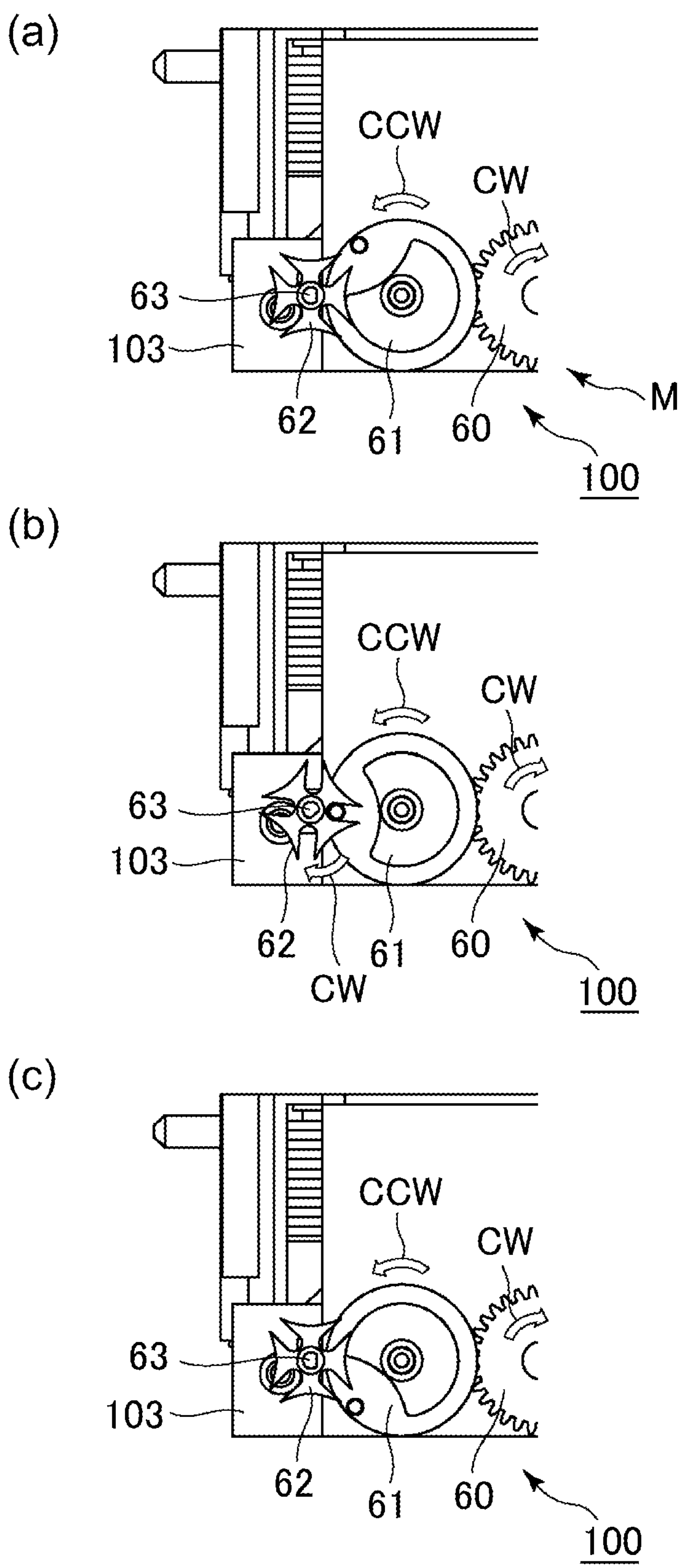

Parts (a) through (c) of FIG. 10 are conceptual views of the drive transmission during the operation of the toner transport means according to embodiment 1 of the present invention.

Figure 11:
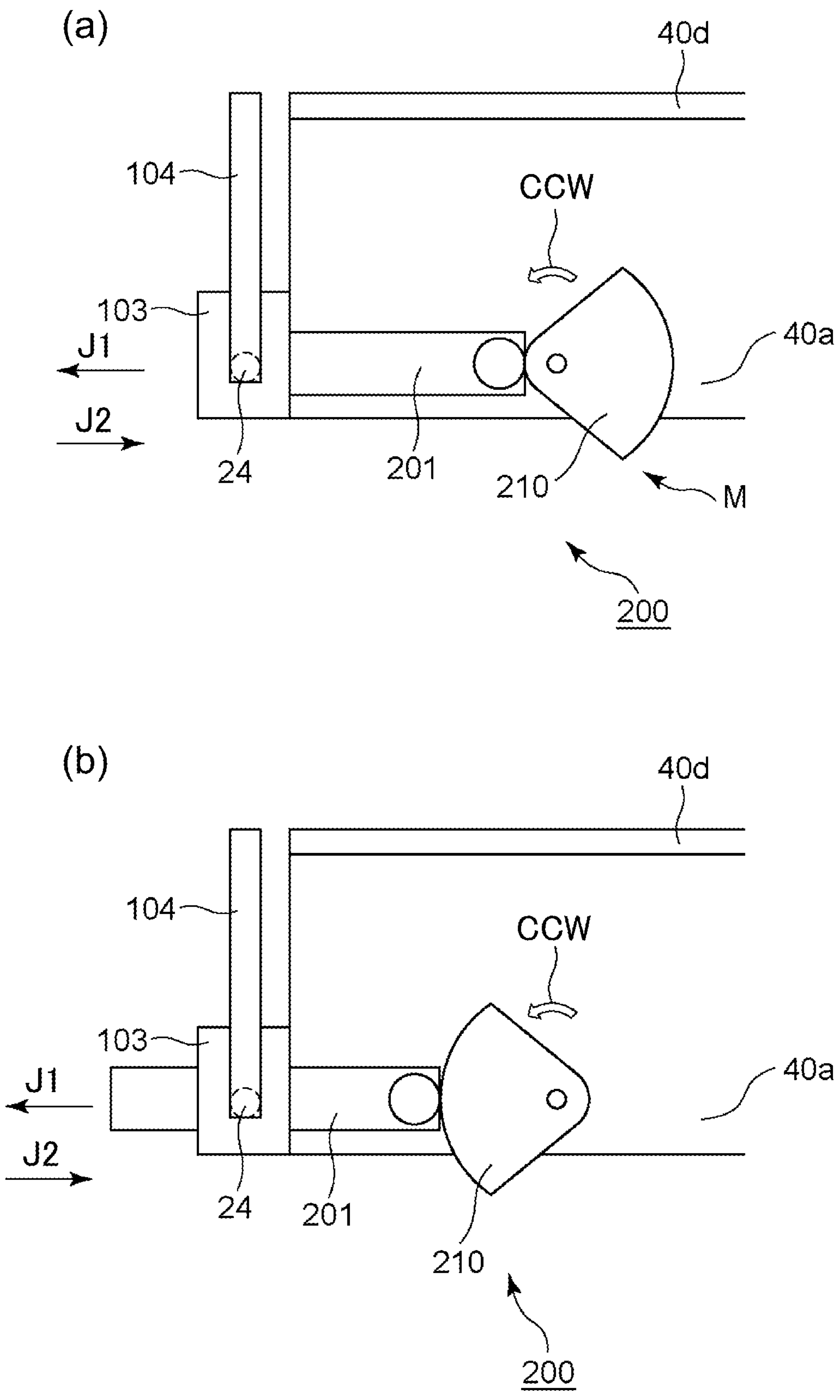

Part (a) and (b) in FIG. 11 are conceptual views of the drive transmission during the operation of the toner transport member according to embodiment 2 of the present invention.

Figure 12:
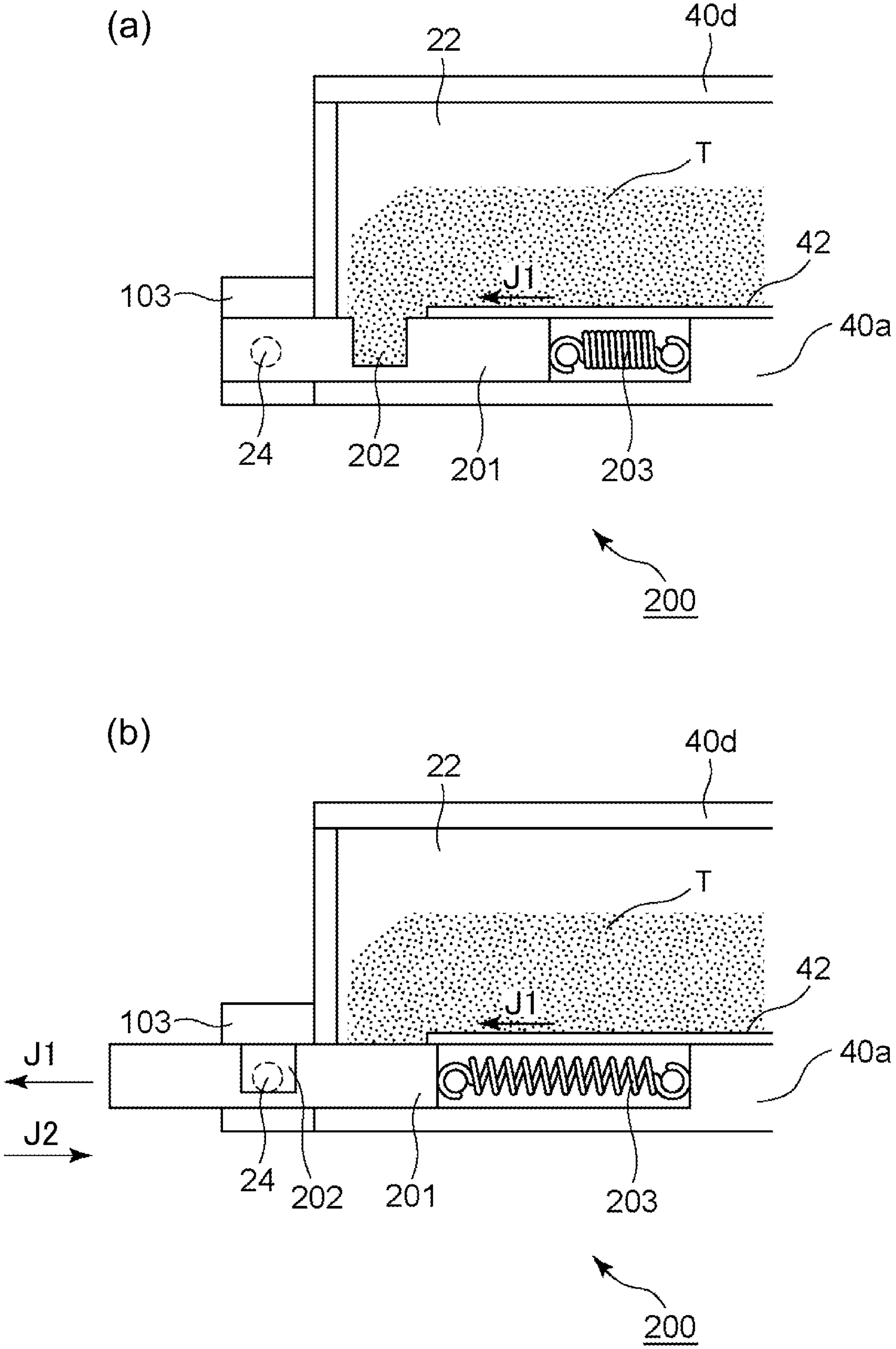

Parts (a) and (b) of FIG. 12 are cross-sectional views of the toner transport member in operation according to embodiment 2 of the present invention.

Figure 13:
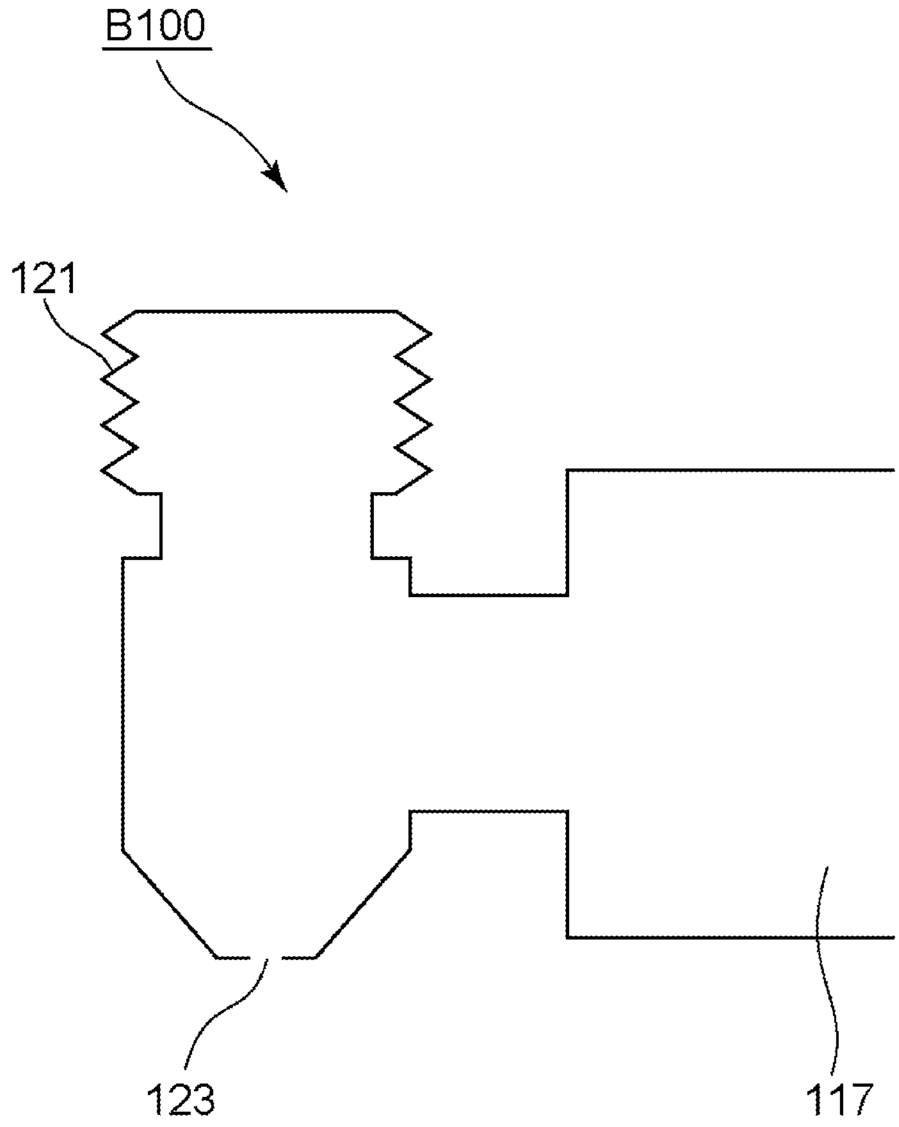

FIG. 13 is a cross-sectional view of the main part of a conventional toner cartridge.

EMBODIMENTS FOR CARRYING OUT THE INVENTION

The following is an explanation of each embodiment of the present invention.

In each of the following embodiments, an image forming apparatus is one that forms images on a recording medium using an electrophotographic image forming process, and includes, for example, electrophotographic copiers, electrophotographic printers (LED printers, laser beam printers, etc.), electrophotographic FAX machines, etc.

A developer replenishment device is defined as having at least an accommodating container for the developer and a discharging means for discharging the developer from the accommodating container. For example, in the following embodiments, a developer replenishment device will be described as in the form of a toner cartridge. The developer replenishment device may be configured to be detachable from the main body of the image forming apparatus.

Embodiment 1

(Image Forming Apparatus C)

Figure 1:
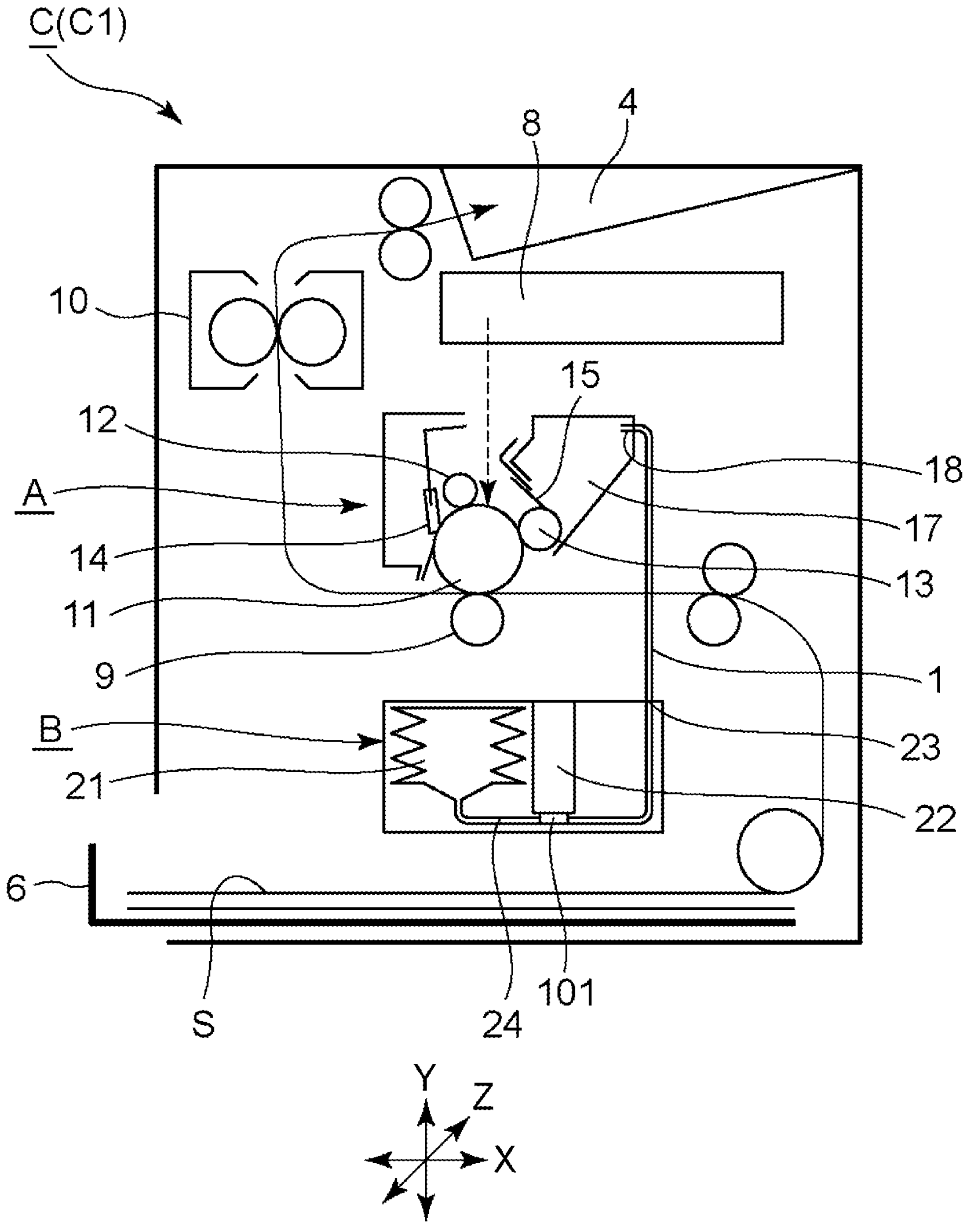
FIG. 1 is a cross-sectional schematic view of the image forming apparatus according to embodiment 1 of the present invention.

First, the overall configuration of the image forming apparatus is described using FIG. 1.

FIG. 1 is a cross-sectional schematic view of the image forming apparatus according to embodiment 1 of the present invention.

In the following explanation, the coordinate system is defined as follows: "Y-direction" for the vertical direction, "X-direction" for the horizontal direction, and "Z-direction" for the depth direction shown in FIG. 1.

In a main body of the apparatus C1 of the image forming apparatus C, a process cartridge A and a toner cartridge B (developer replenishment device) are mounted for image forming.

In an image forming operation, a sheet S (recording paper) is fed from a sheet cassette 6 installed in the lower part of the main body of the apparatus, and synchronized with this sheet feeding, a photosensitive drum 11 (image bearing member) is selectively exposed from an exposure unit 8 to form a latent image.

Toner is supplied to a developing roller 13 (developer bearing member) from a toner accommodation portion 17, and a thin layer of toner is borne on the surface of the developing roller 13 by a developing blade 15. By applying a developing bias to the developing roller 13, toner is supplied according to the latent image and developed into a toner image. This image is transferred to the sheet S being fed by applying a transfer bias to a transfer roller 9.

The sheet S is fed to a fixing device 10 to fix the image and is discharged to a discharge portion 4 at the top of the apparatus. The toner accommodated in the toner cartridge B is supplied to the process cartridge A from a discharge portion 23 (opening portion) through the main body of the apparatus C1, through a main body path portion 1, and through a receiving portion 18. The main body path portion 1 is hollow and tubular (tube-like).

(Process Cartridge A)

FIG. 1 is used to describe the configuration of the process cartridge A.

A process cartridge is equipped with an image bearing member and process means that act on the image bearing member. The process means includes, for example, a charging means for charging the surface of the image bearing member, a developing device for forming an image on the image bearing member, and a cleaning means for removing residual toner on the surface of the image bearing member.

The process cartridge A in the present embodiment is configured to be detachable from the main body of the apparatus C1. The process cartridge A is equipped with a charging roller 12 as a charging means and an elastic cleaning blade 14 as a cleaning means around the photosensitive drum 11, which is the image bearing member.

The process cartridge A is also equipped with the developing roller 13 and the developing blade 15 as a developing means, and a toner accommodation portion 17 for storing toner. The toner accommodation portion 17 has a receiving portion 18 that receives toner supplied from the toner cartridge B, which is described below.

Here, the transport of toner inside the image forming apparatus C is explained first. That is, the flow of toner from the toner cartridge B to the process cartridge A is explained.

Figure 2:
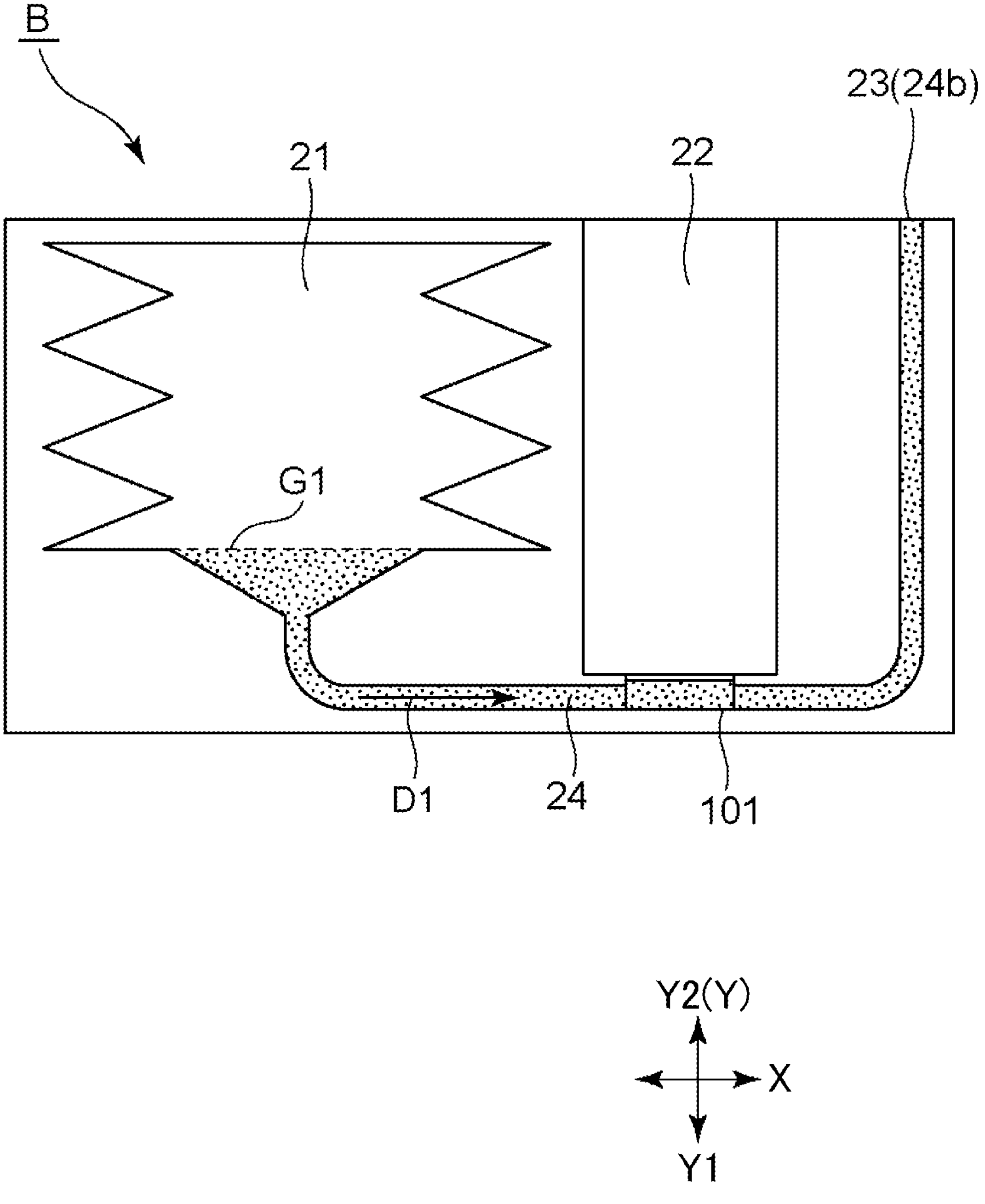
FIG. 2 is a cross-sectional schematic view of the toner cartridge according to embodiment 1 of the present invention.

FIG. 2 is a cross-sectional conceptual view of the toner cartridge according to embodiment 1 of the present invention.

Figure 3:
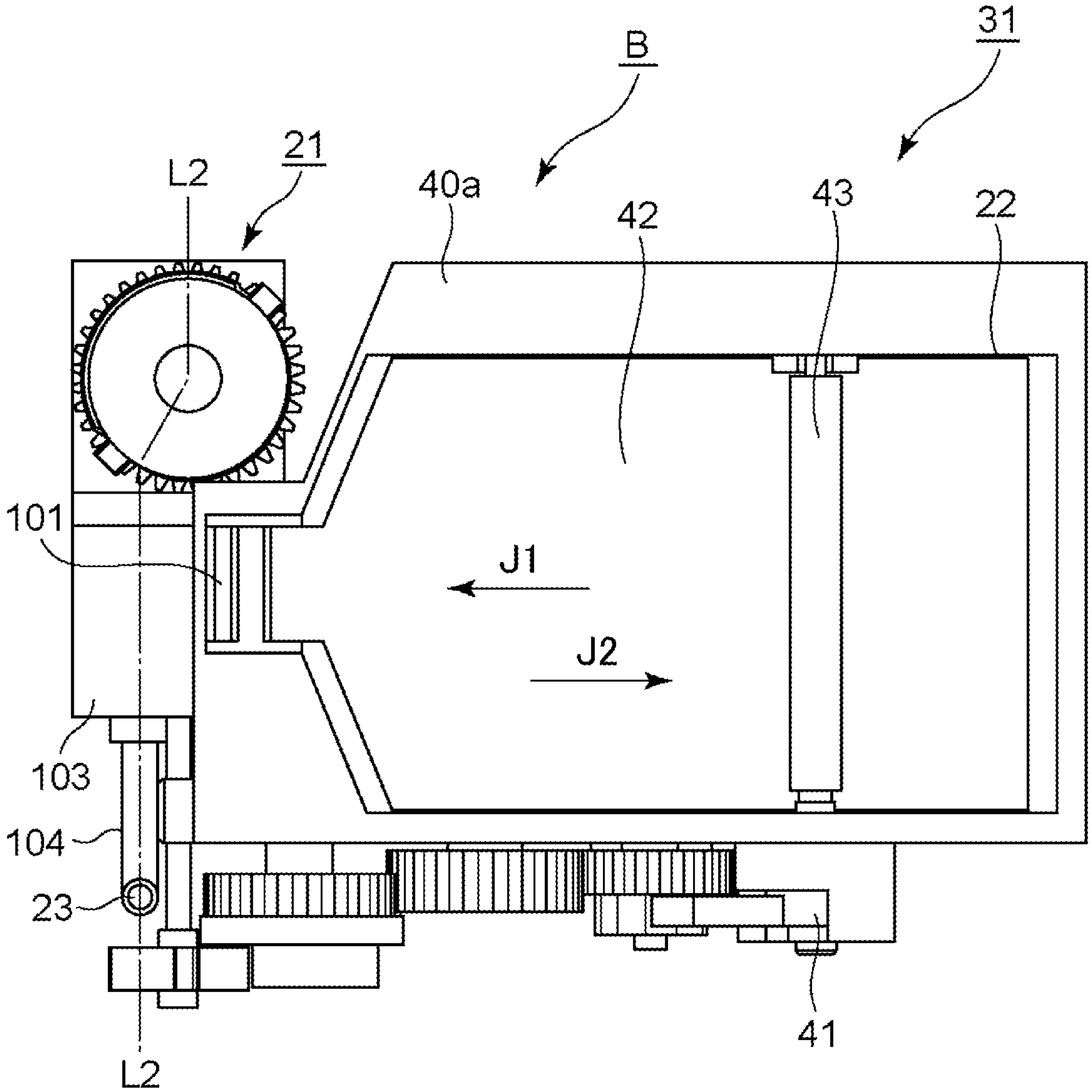
FIG. 3 is a top schematic view of the toner cartridge according to embodiment 1 of the present invention.

FIG. 3 is a schematic top view of the toner cartridge according to embodiment 1 of the present invention. That is, FIG. 3 conceptually shows the state of the toner cartridge when viewed along the direction Y1 shown in FIG. 2. FIG. 2 also conceptually shows the cross-section of the one-pointed line L2 in FIG. 3, viewed along the right direction in FIG. 3.

Inside a toner accommodation portion 22 of the toner cartridge B is a feeding means 31, described below. The toner is fed in the direction J1 at one longhand direction of the toner cartridge B.

The feeding means 31 (transport member) includes a plate-shaped (feeding) member 42 (hereinafter also referred to as "feeding member 42"). An upper surface 421 of the feeding member 42 is a bearing surface capable of bearing toner. The toner is fed by reciprocating the feeding member 42 in the J1 direction at one longhand direction and in the direction J2 at the other end, and by increasing the acceleration when moving in the direction J2 compared to the acceleration when moving in the direction J1.

That is, the feeding means 31 can feed toner from the toner accommodation portion 22 to a toner retention portion 102 (retention portion, holding portion), which is described below.

The feeding means 31 may be composed of a plate-like member with a bearing surface (top surface 421). The feeding means 31 can be moved back and forth so that the maximum acceleration in the first direction (J1) approaching the toner retention portion 102 (retention portion) is less than the maximum acceleration in the second direction J2, which is the opposite direction of the first direction, away from the toner retention portion 102 (retention portion).

As shown in FIG. 3, the toner sent to the first direction J1 side by the feeding means 31 is collected by a toner transport member 101 (retention member), which is described later.

Toner supplied to the toner transport member 101 is transported to a flow passage 24 (path) as shown in FIG. 2 as the toner transport member 101 moves. The flow of toner from the toner transport member 101 to the flow passage 24 (path) is described below.

The toner transported to the flow passage 24 (path) moves along the direction D1 of air flow generated when the pump portion 21 is compressed and air is sent to the discharge portion 23 side.

As shown in FIG. 1, the toner discharged from the discharge portion 23 of the toner cartridge B is passed through a main body path 1 of the image forming apparatus C to the toner accommodation portion 17 through the receiving portion 18 of the process cartridge A.

(Toner Cartridge B)

Next, the configuration of the toner cartridge B is explained using FIGS. 2 through 5.

Figure 4:
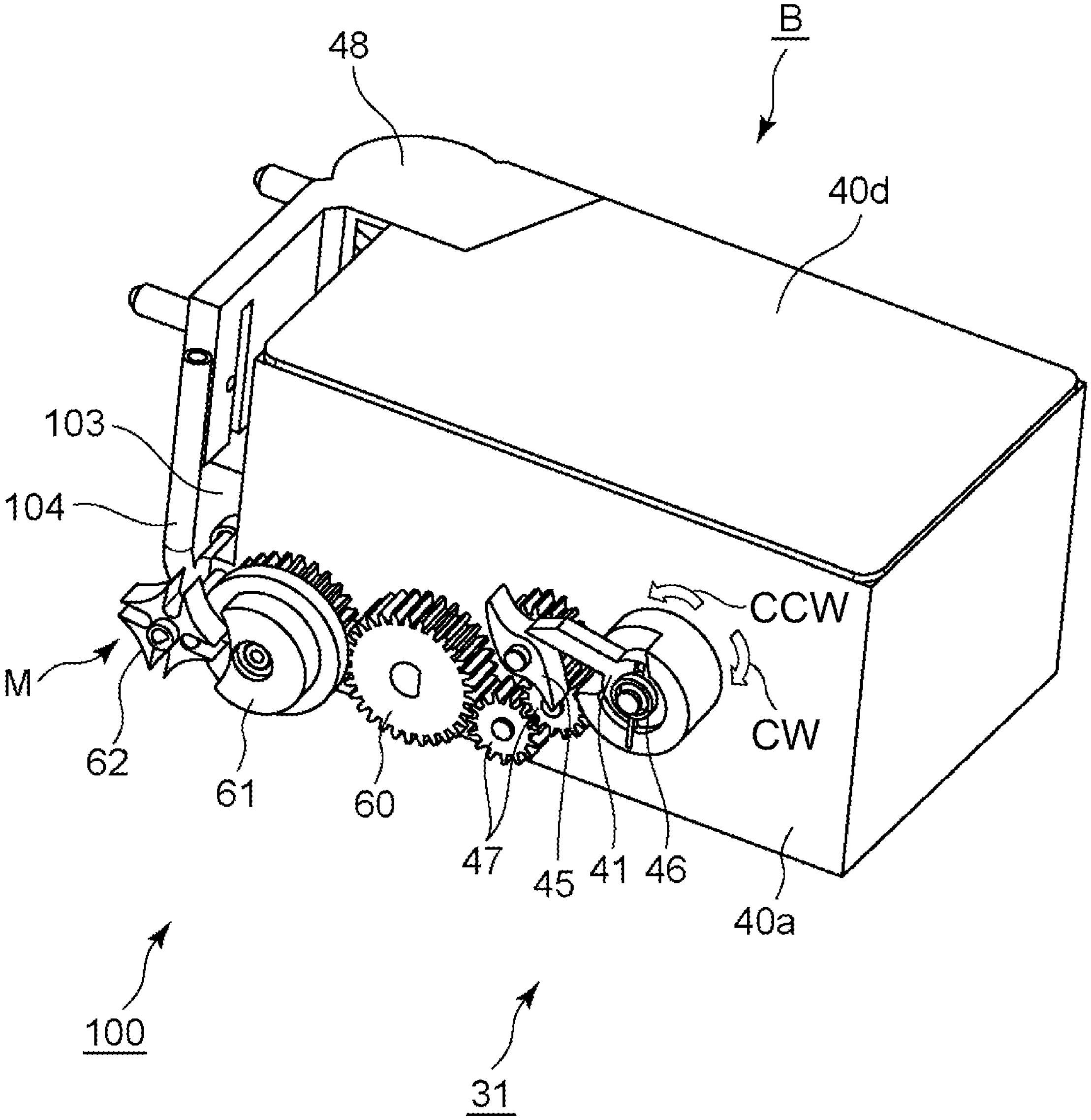
FIG. 4 is a schematic view of the toner cartridge according to embodiment 1 of the present invention.

FIG. 4 is a schematic view of the toner cartridge according to embodiment 1 of the present invention.

Figure 5:
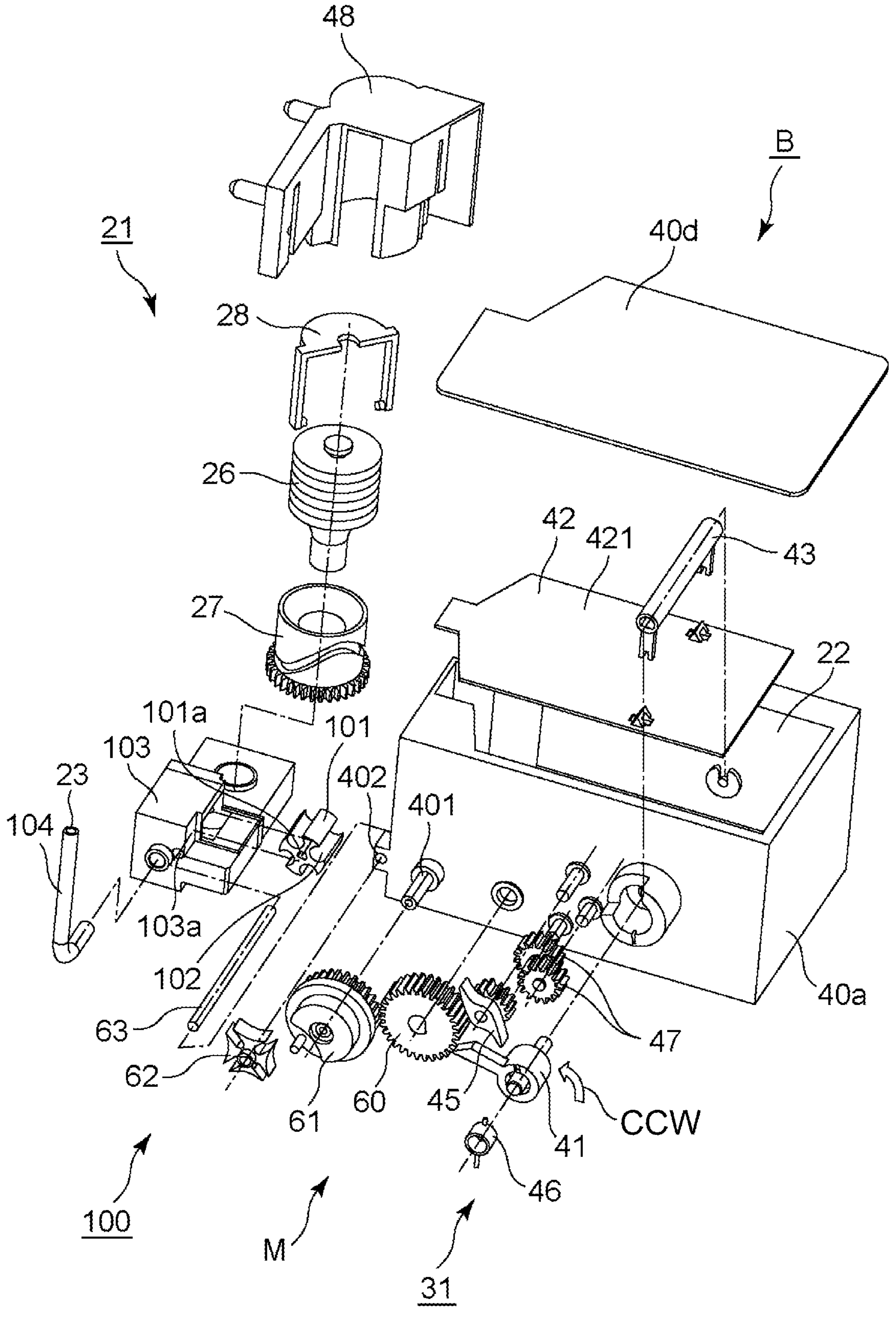
FIG. 5 is an exploded schematic view of the toner cartridge according to embodiment 1 of the present invention.

FIG. 5 is a conceptual view of a disassembled (pre-assembled) toner cartridge according to embodiment 1 of the present invention.

FIG. 2 is a cross-sectional view of the toner cartridge according to embodiment 1 of the present invention.

In the present embodiment, the toner cartridge B is configured to be detachable from the main body of the apparatus C1.

The toner cartridge B (developer replenishment device) is used in the image forming apparatus C. The toner cartridge B has a toner accommodating portion 22 (accommodating container) that holds toner (developer), a pump portion 21 (pump) with variable volume, a feeding path member 103, and a toner transport means 100 (transport member) as described below.

The feeding path member 103 has a flow passage 24 (path) for feeding of toner. One end 24*a* of the flow passage 24 is connected to the pump portion 21, and at the other end 24*b* is a discharge portion 23 (opening) that opens to outside of the toner cartridge B. That is, the flow passage 24 is configured so that toner can be fed between the pump portion and the opening.

The pump portion 21 (pump) can create a flow of air through a change in volume. The toner in the flow passage 24 is moved (fed) by the air flow created by the pump portion 21. The toner in the toner accommodation portion 22 can then be discharged (replenished) to the outside of the toner cartridge B (i.e., to the process cartridge A side, as described below) via the discharge portion 23.

A toner transport means 100 (transport member), described below, connects the toner accommodation portion 22 and the feeding path member 103 (flow passage 24), and can transport toner from the toner accommodation portion 22 to the feeding path member 103 (flow passage 24). In other words, the toner transport means 100 is arranged in the middle of the flow passage 24 to stably supply a predetermined amount of toner from the toner accommodation portion 22 to the flow passage 24.

The toner transport means 100, described below, has a toner transport member 101 (retaining member, holding member) equipped with a toner retention portion 102 (retaining portion) that holds a predetermined volume of toner, and a moving mechanism M. The moving mechanism M moves the toner transport member 101.

Specifically, the toner transport member 101 can be moved (switched) between the first position P1 (state) and the second position P2 (state) by the moving mechanism M.

In the first position (state) P1, the toner accommodation portion 22 communicates with the toner retention portion 102 and toner can be filled from the toner accommodation portion 22 to the toner retention portion 102. In the second position (state) P2, the toner retention portion 102 communicates with the feeding path member 103 (flow passage 24) communicate with each other.

As shown in FIG. 4, the toner cartridge Bis outlined by a frame 40*a*, a lid 40*d*, and a pump cover 48.

As shown in FIG. 5, the toner cartridge B consists of a frame 40*a*, lid 40*d*, feeding means 31, toner transport means 100 (moving member), tube 104, pump portion 21, and pump cover 48.

The feeding means 31 includes a feeding member 42, a feeding shaft 43, a swinging rotating member 41, an urging member 46, a rotating member 45, an idler gear 47, and an input gear 60.

The toner transport means 100 (moving member) includes a drive mechanism M and a toner transport member 101 (bearing member). The drive mechanism M includes an input gear 60, a rotating member 61, a Geneva wheel 62, and a shaft member 63.

The pump portion 21 includes a bellows member 26, a pump driving gear 27, and a pump driving reciprocating member 28.

(Pump Portion 21)

Figure 6:
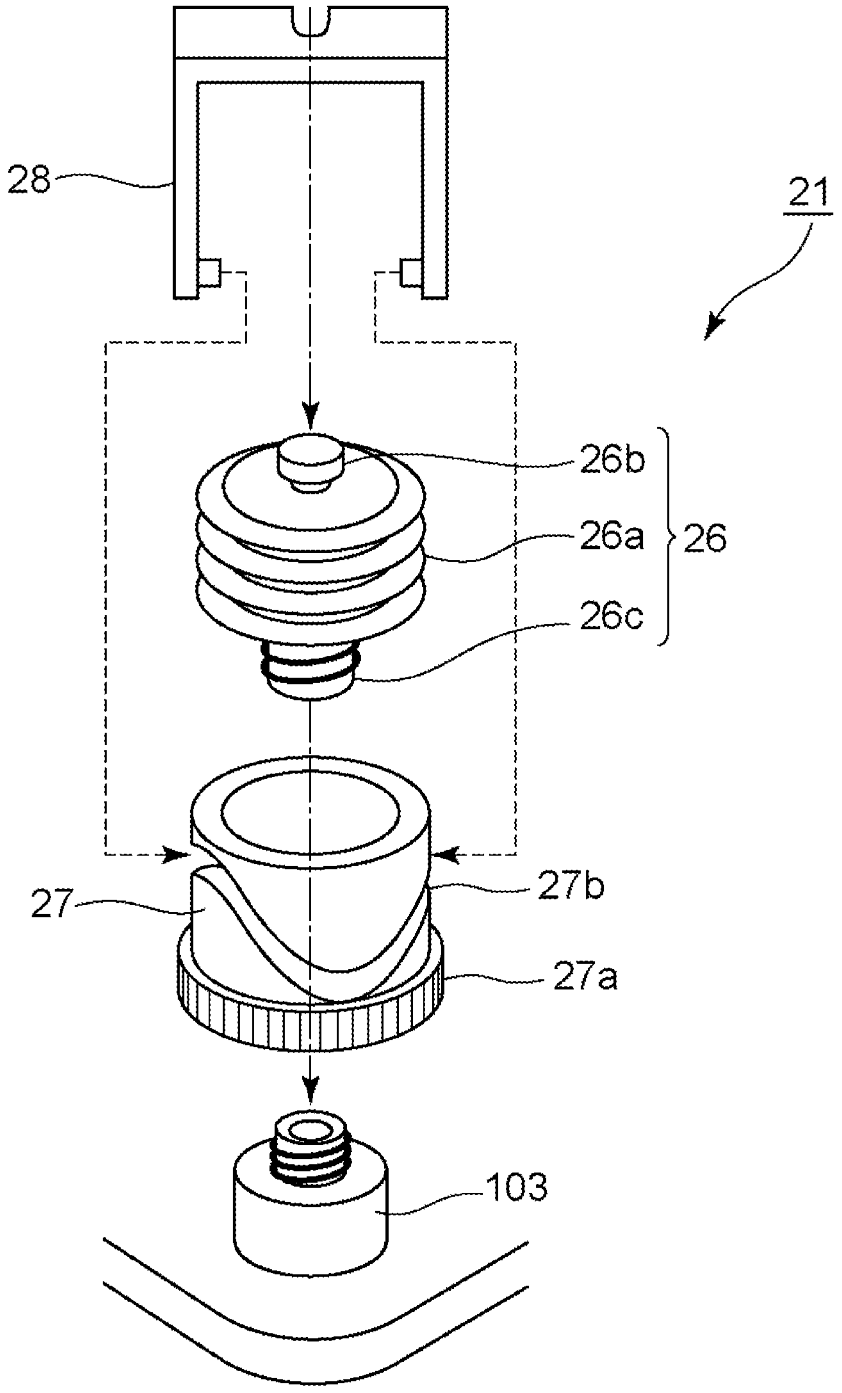
FIG. 6 is an exploded schematic view of the pump portion according to embodiment 1 of the present invention.

The configuration of the pump portion 21 and the area around the pump portion 21 is explained here using FIGS. 6 through 8.

FIG. 6 is a disassembled conceptual view of the pump portion according to embodiment 1 of the present invention.

Parts (a) and (b) of FIG. 7 are cross-sectional views of the pump portion during assembly according to embodiment 1 of the present invention.

Parts (a) and (b) of FIG. 8 are conceptual views showing the various states of the pump portion during its operation according to embodiment 1 of the present invention.

More specifically, FIGS. 6 and 8 show the driving configuration of the pump portion 21 of the present invention.

In particular, part (a) of FIG. 8 shows the state in expansion, and part (b) shows the state in compression. Part (a) of FIG. 7 shows the state before assembly, and part (b) shows the state after assembly.

As shown in FIG. 6, the pump portion 21 consists of a portion of bellows member 26 that is round in cross-sectional view and open at the bottom. The bellows member 26 consists of a bellows part 26*a*, an engagement portion 26*b* that engages a pump driving reciprocating member 28 at one end, and a fixing portion 26*c* that is open at the other end and secures the pump.

As shown in part (a) of FIG. 7, a fixed portion 26*c* has a threaded shape and is fixed to the feeding path member 103 by rotating in the D3 direction. The feeding path member 103 has the flow passage 24 inside. In the future explanation, the pump portion 21 refers to the bellows portion 26*a*, which undergoes a volume change. On the other hand, the fixed portion 26*c*, which does not change volume, is included in the flow passage 24, not the pump portion 21. Therefore, the boundary between the pump portion 21 and the flow passage 24 is the boundary G1 between the bellows portion of the bellows member 26 and the fixed portion 26*c*, as shown in part (b) of FIG. 7.

As shown in FIG. 8, the pump portion 21 compresses downward and extends upward through a pump driving gear 27 and a pump driving reciprocating member 28. The pump driving gear 27 has a gear portion 27*a* and a cam portion 27*b* and the gear portion 27*a* receives driving force input from the image forming apparatus C and rotates in the direction D2. The rotation direction moves the pump driving reciprocating member 28, which is engaged with the cam portion 27*b*, in the vertical direction.

(Feeding Means 31)

Next, the drive configuration of the feeding means 31 is explained using FIGS. 4 and 5.

As shown in FIG. 5, a frame 40*a* is provided with a rotating member 45 and a swinging rotating member 41, each of which has a rotatable supporting portion, and a communication port, which is a hole for the swinging rotating member 41 and the conveyance shaft 43 to engage with each other. The swinging rotating member 41 is configured so that a part of the swinging rotating member 41 engages the feeding shaft 43 provided in the toner accommodation portion 22 through the communication port.

As shown in FIG. 4, the idler gear 47 meshes with the gear portion of the rotating member 45, and the input gear 60 is configured to rotate the rotating member 45 via the idler gear 47. The swinging rotating member 41 has an arm portion contacting the cam portion of the rotating member 45. The urging member 46 is composed of a torsion coil spring, and the direction in which the urging member 46 generates urging force is set in the direction CCW.

Next, the toner feeding action of the feeding member 42 is explained using FIGS. 3 and 4.

As shown in FIG. 4, the driving force (not shown) in the main body of the apparatus C causes the input gear 60 to rotate, which causes the swinging rotating member 41 to rotate in the direction CW through the idler gear 47 and rotating member 45, and to rotate in the direction CCW through the urging member 46.

In this case, as shown in FIG. 3, the toner on the feeding member 42 is fed in the feeding direction J1 by the reciprocating motion of the feeding member 42, which is linked to the motion of the swinging rotation member 41 via the feeding shaft 43, and in the opposite direction J2.

(Toner Transport Means 100)

Next, the drive configuration of the toner transport means 100 is explained using FIGS. 5, 9, and 10.

Parts (a) through (c) of FIG. 9 are cross-sectional conceptual views of the toner transport member in each state of operation according to embodiment 1 of the present invention. That is, FIG. 9 conceptually shows the main cross-sectional view of the toner transport means 100.

Parts (a) through (c) of FIG. 10 are conceptual views of the drive transmission during the operation of the toner transport means according to embodiment 1 of the present invention.

As shown in part (a) of FIG. 9, a toner transport member 101 with a shaft member 63 connected to it is placed in a frame 40*a* of the toner accommodation portion 22.

As shown in FIG. 5, a supporting hole 401 and a supporting portion 402 are provided in the frame 40*a* to rotatably support the shaft member 63 and the rotating member 61, respectively. The shaft member 63 is connected to an engagement hole 101*a* of the toner transport member 101, which is encased inside the feeding path member 103, through a supporting hole 103*a* of the feeding path member 103. The feeding path member 103 is attached to the frame 40*a* with the toner transport member 101 inside.

A Geneva wheel 62 is attached to one end of the shaft member 63, and when the rotating member 61 rotates once, the Geneva wheel 62 rotates 90 degrees.

Next, the configuration of the toner transport member 101 is described using FIG. 9.

As shown in FIG. 9, the toner transport member 101 is a cylindrical member for transporting toner in the toner accommodation portion 22 to the flow passage 24. The outer circumference of the toner transport member 101 is provided with a toner retention portion 102 (holding portion) for holding (retaining) toner inside in the same shape at four locations (102*a* through 102*d*) at 90-degree intervals in a plurality of locations. That is, a plurality of toner retention portions (102*a* through 102*d*) are placed on the toner transport member 101 at an equal distance from each other.

The toner transport member 101 is rotated by a moving mechanism M so that the toner retention portion 102 moves along a circular locus.

The toner transport member 101, which is encased in the transport path member 103, is positioned such that one of the toner retention portions 102 becomes part of the flow passage 24 of the feeding path member 103 while the shaft member 63 is not rotating. At the same time, one of the toner retention portions 102 of the toner transport member 101 is positioned such that the toner in the toner accommodation portion 22 can be supplied by the feeding member 42.

Next, the action of a toner transport means 100 is explained using FIGS. 9 and 10.

When the driving force (not shown) in the main body of the apparatus C causes the input gear 60 to rotate in the direction CW, as shown in part (a) of FIG. 10, the rotating member 61 meshing with the input gear 60 rotates in the direction CCW. Then, as shown in parts (a), (b), and then (c) of FIG. 10, the Geneva wheel 62 is configured to rotate 90 degrees in the direction CW for each rotation of the rotating member 61. The movement of the Geneva wheel 62 is transmitted to the toner transport member 101 via the shaft member 63. Therefore, the toner transport member 101 rotates 90 degrees in the direction CW in conjunction with the rotation direction of the Geneva wheel 62 in the direction CW, as shown in parts (a) and (b) through (c) of FIG. 9.

At this time, as shown in part (a) of FIG. 9, the toner retention portion 102 of the toner transport member 101 is supplied with toner T that is fed in the feeding direction J1 of the feeding member 42 in the toner accommodation portion 22. As the toner transport member 101 rotates, it changes through parts (a) and (b) to the state shown in part (c) of FIG. 9 to retain a predetermined amount of toner by scraping the toner in the toner retention portion 102 along the circumferential surface of the feeding path member 103.

Furthermore, the toner retention portion 102 of the toner transport member 101 rotates with a predetermined amount of toner inside and becomes part of the flow passage 24 of the feeding path member 103, as shown in part (c) of FIG. 9.

With the toner retention portion 102 becoming part of the flow passage 24, the air generated by the compression of the pump portion 21 passes through the flow passage 24, along with the toner contained by the toner retention portion 102, which is part of the flow passage 24, to eject the toner toward the discharge portion 23. The toner sent from the discharge portion 23 of the toner cartridge B is then fed through the main body path portion 1 of the image forming apparatus C, through the receiving portion 18 of the process cartridge A, and into the toner accommodation portion 17 of the process cartridge A.

By repeating this series of operations, the amount of toner supplied from the toner accommodation portion 22 of the toner cartridge B to the toner accommodation portion 17 of the process cartridge A is controlled.

The action of the toner transport means described above ensures that a predetermined amount of toner is stably supplied from the toner transport member 101 to the (toner) flow passage 24, making it possible to control the amount of toner supplied from the toner cartridge B to the toner accommodation portion 17 of the process cartridge A.

In the present embodiment, the volume of the pump portion 21 is more than twice the volume of the flow passage 24, with the volume of the pump portion 21 being about 10 cc and the combined volume of the flow passage 24 and the main body path portion 1 being about 3 cc. The volume of the toner retention portion of the toner transport member is about 0.4 cc.

The above conditions are not limited to these, but can be selected as appropriate depending on the type and characteristics of toner, the shape, material, and arrangement of each component, and other factors.

The toner feeding means is not limited to the reciprocating feeding member described above, but can also be configured to use a rotating agitator sheet or screw, or a toner feeding method that uses the dead weight of the toner without a transfer member.

Embodiment 2

While in embodiment 1, a configuration in which toner transport member 101 rotates to stably supply a predetermined amount of toner to the flow passage 24, in the present embodiment, a configuration in which toner transport member 201 moves in parallel to stably supply a predetermined amount of toner to the flow passage 24 will be described.

The image forming process and the configuration of the process cartridge A are the same as in embodiment 1, and the configuration of the toner cartridge B is the same as in embodiment 1 except for the configuration of the toner transport means.

(Composition of Toner Transport Means)

FIGS. 11 and 12 are used to explain the configuration of a toner transport means 200, which is the characteristic configuration of the present embodiment.

Parts (a) and (b) of FIG. 11 are conceptual views of the drive transmission during operation of the toner transport member according to embodiment 2 of the present invention.

Parts (a) and (b) of FIG. 12 are cross-sectional conceptual views of the toner transport member in operation according to embodiment 2 of the present invention.

As shown in FIG. 11, the toner transport means 200 consists of a cam member 210, a toner transport member 201, a feeding path member 103, and, as shown in FIG. 12, an urging member 203.

As shown in parts (a) and (b) of FIG. 11, the toner transport member 201 is configured to move parallel to direction J1 by rotation of the cam member 210 in the direction CCW. Furthermore, as shown in parts (a) and (b) of FIG. 12, one end of the urging member 203 is connected to the toner transport member 201, and by fixing the other end of the urging member 203 to the frame 40*a*, the toner transport member 201 is configured to be urged in the direction J2.

Next, the configuration of the toner transport member 201 is explained using FIG. 12.

As shown in part (a) of FIG. 12, the toner transport member 201 is a square prism-shaped member for transporting toner in the toner accommodation portion 22 to the flow passage 24. A part of the toner transport member 201 has a toner retaining portion 202 for retaining toner inside.

Next, the operation of the toner transport member 201 will be explained using FIGS. 11 and 12.

As shown in parts (a) and (b) of FIG. 11, each time the cam member 210 makes one rotation in the direction CCW, the toner transport member 201 moves back and forth in the J1 and J2 directions.

At this time, the toner fed in the feeding direction J1 of the feeding member 42 in the toner accommodation portion 22 is supplied to the toner retention portion 202 of the toner transport member 201. As the toner transport member 201 moves in parallel, the toner in the toner retention portion 202 is scraped off by the frame 40*a*, and a predetermined amount of toner is held in a stable state.

Furthermore, the toner retention portion 202 of the toner transport member 201 moves in parallel with a predetermined amount of toner inside and is configured so that the toner retention portion 202 becomes part of the flow passage 24 of the feeding path member 103 in the state shown in part (b) of FIG. 12 when the movement is completed.

As shown in part (b) FIG. 12, with toner retention portion 202 becoming part of the flow passage 24, the air generated by the compression of pump portion 21 passes through the flow passage 24. The toner is then passed through the flow passage 24 together with the toner contained by the toner retention section 202, which is part of the flow passage 24, and the toner is ejected toward the discharge portion 23. The toner delivered from the discharge portion 23 of the toner cartridge B is fed through the main body path portion 1 of the image forming apparatus C to a toner retention portion 17 of the process cartridge A through the receiving portion 18 of the process cartridge A.

By repeating this series of operations, the amount of toner supplied from the toner accommodation portion 22 of the toner cartridge B to the toner accommodation portion 17 of the process cartridge A is controlled.

The action of the toner transport means described above ensures that a predetermined amount of toner is stably supplied from the toner transport member 201 to the flow passage 24, making it possible to control the amount of toner supplied from the toner cartridge B to the toner accommodation portion 17 of the toner cartridge A.

Thus, the configuration of the present embodiment can stably feed a predetermined amount of toner. In particular, the air flow generated by the pump can be used to stably feed a predetermined amount of toner from the developer accommodation portion upward and away from the developer.

The present invention can be summarized as follows.

(1) The developer replenishment device (B) is used in an image forming apparatus (C) and has an accommodating container (22) that accommodates the developer, a pump (21) with variable volume, a feeding path member (103), and a transport member (100).

The feeding path member has a pump connected at one end (24*a*) and an opening portion (23) at the other end (24*b*) that opens to the outside, forming a path (24) that feeds the developer between the pump and the opening portion.

The transport member communicates the accommodation container and the feeding path member and is configured to transport the developer from the accommodation container to the feeding path member, and is provided with a retention member (101) having a retention portion (102) that holds a predetermined volume of developer, and a movement mechanism (M).

The moving mechanism is configured to move the retention member (101) between a first position (P1) where the accommodation container and the retention portion are connected and the retention portion can be filled with developer from the accommodation container, and a second position (P2) where the retention portion and the feeding path member are connected.

(2) In the developer replenishment device of the present invention, there can be a plurality of retention portions (102*a* through 102*d*) positioned in the retention member (101).

(3) In the developer replenishment device of the present invention, a plurality of retention portions (102) may be arranged on the retention member (101) at an equal distance from each other.

(4) In the developer replenishment device of the present invention, the retention member (101) may be rotated by the moving mechanism (M) so that the retention portion (102) moves along a circular locus.

(5) The developer replenishment device of the present invention can be equipped with a feeding member (31) that feeds the developer from the accommodation container (22) to the retention portion (102).

(6) In the developer replenishment device of the present invention, the feeding member (31) may comprise a plate-like member (42) provided with a bearing surface (421) that can bear the developer in the posture (attitude) in use. In this case, the feeding member (31) may be moved back and forth so that the maximum acceleration in the first direction (J1) approaching the retention portion (102) is less than the maximum acceleration in the second direction (J2), which is away from the retention portion (102) and opposite to the first direction.

(7) In the developer replenishment device of the present invention, the driving operation of the feeding member (31) and the moving mechanism (M) can be performed in synchronization.

Specifically, when driving the moving mechanism (M) to the position where the retention portion (102) of the retention member (101) is connected to the accommodation container, the driving motion of the feeding member (31) may be synchronized so that the feeding member (31) is moved in the first direction (J1) closer to the retention portion (102).

(8) In the developer replenishment device of the present invention, the driving operation of the moving mechanism (M) and the pump (21) can be synchronized.

Specifically, when the moving mechanism (M) is driven to the position where the retention portion (102) of the retention member (101) is connected to the flow passage (24) of the feeding path member, the drive operation may be synchronized so that the pump (21) performs a compression operation.

(9) In the developer replenishment device of the present invention, the accommodation container (22) may be configured to be detachable from the developer replenishment device (B).

(10) The image forming apparatus of the present invention is equipped with the aforementioned developer replenishment device (B), a developer bearing member (13) that bears the developer supplied from the developer replenishment device, and an image bearing member (11) that bears a developer image made of the developer.

INDUSTRIAL APPLICABILITY

According to the present invention, a developer replenishment device and an image forming apparatus for supplying a developer are provided.

The present invention is not limited to the above embodiments, and various changes and variations are possible without departing from the spirit and scope of the invention. Accordingly, the following claims are appended to make public the scope of the invention.

This application claims priority based on Japanese Patent Application No. 2020-209007, filed Dec. 17, 2020, the entire contents of which are hereby incorporated herein by reference.

What is claimed is:

1. A developer cartridge mountable to and dismountable from a main assembly of an image forming apparatus, the cartridge comprising:

an accommodating container configured to accommodate developer;

a pump that is variable in volume;

a feeding path member of which one end is connected to the pump and the other end is provided with a discharge outlet, the feeding path member being configured to form a path for feeding the developer between the pump and the discharge outlet; and a transporting member configured to communicate with the developer in the accommodating container and to transport the developer from the accommodating container to the feeding path member, wherein the developing cartridge is constituted such that the developer transported to the feeding path member by the transporting member is discharged to outside of the developer cartridge via the discharging outlet by air generated from the pump, and wherein the transporting member includes:

a holding member provided with a holding portion configured to hold a predetermined amount of the developer; and a moving mechanism configured to move the holding member between a first position where the accommodating container and the holding portion communicate with each other and the holding portion is capable of being filled with the developer from the accommodating container and a second position where the holding portion and the feeding path member communicate with each other.

2. A developer replenishment device according to claim 1, wherein the holding member is provided with a plurality of holding portions.

3. A developer replenishment device according to claim 1, wherein the plurality of the holding portions are disposed in the holding member at mutually equal intervals.

4. A developer replenishment device according to claim 1, wherein the holding portion is rotated by the moving mechanism so as to move along a circular locus.

5. A developer replenishment device according to claim 1, further comprising a transporting member configured to transport the developer from the accommodating container to the holding portion.

6. A developer replenishment device according to claim 5, wherein the transporting portion is constituted by a plate-like member provided with a bearing surface capable of bearing in an attitude when the developer cartridge is mounted to the main assembly, the transporting member configured to be reciprocated such that a maximum acceleration in a first direction approaching the holding member becomes less than a maximum acceleration in a second direction, opposite to the first direction, away from the holding member.

7. A developer replenishment device according to claim 5, wherein a driving operation of the feeding member and an operation of the moving mechanism are configured to be synchronously performed.

8. A developer replenishment device according to claim 1, wherein an operation of the moving mechanism and a driving operation of the pump are configured to be synchronously performed.

9. A developer replenishment device according to claim 1, wherein the accommodating container is mountable to and dismountable from frame for supporting the pump.

10. An image forming apparatus comprising:

a developer cartridge according to claim 1;

a developer bearing member configured to bear the developer supplied from the developer cartridge; and an image bearing member configured to bear a developer image formed by the developer.

* * * * *